(12) United States Patent
Wilson

(10) Patent No.: US 6,586,088 B1
(45) Date of Patent: Jul. 1, 2003

(54) EXTERIOR PANELS FOR MOTOR VEHICLES

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/701,018

(22) PCT Filed: May 20, 1999

(86) PCT No.: PCT/US99/11194

§ 371 (c)(1),
(2), (4) Date: Mar. 8, 2001

(87) PCT Pub. No.: WO99/61281

PCT Pub. Date: Dec. 2, 1999

Related U.S. Application Data

(60) Provisional application No. 60/086,616, filed on May 22, 1998.

(51) Int. Cl.⁷ .................................................. B32B 5/02
(52) U.S. Cl. .................... 428/324; 428/325; 428/332; 428/338
(58) Field of Search ................................ 428/323, 324, 428/325, 332, 338

(56) References Cited

U.S. PATENT DOCUMENTS

| | | | |
|---|---|---|---|
| 4,291,084 A | * 9/1981 | Segal | 428/212 |
| 4,621,114 A | 11/1986 | Watanabe | 524/451 |
| 5,231,135 A | 7/1993 | Machell | 525/123 |
| 5,552,469 A | * 9/1996 | Beall et al. | 524/445 |
| 5,747,560 A | 5/1998 | Christiani | 523/209 |

OTHER PUBLICATIONS

Derwent World Patent Index Abstract No. 1993–093960 of EP 598836B (Baughman et al) Oct. 15, 1997.

Derwent World Patent Index Abstract No. 1995–128545 of JP 07053843 A, Feb. 28, 1995.

* cited by examiner

*Primary Examiner*—Paul Thibodeau
*Assistant Examiner*—Christopher Paulraj
(74) *Attorney, Agent, or Firm*—Pillsbury Winthrop LLP

(57) ABSTRACT

An exterior panel (10) for a motor vehicle has a coefficient of linear thermal expansion of less than $20 \times 10^{-6}$ inches of expansion per inch material per degree Fahrenheit. The exterior panel (10) comprises a rigid structure (14) formed from at least one thermoplastic material and reinforcement particles dispersed within the at least one thermoplastic. The reinforcement particles comprise less than 15% of a total volume of the rigid structure. At least 40% of the reinforcement particles have a thickness less than about 50 nanometers. A decorative coating layer (12) having at least one coloring agent is disposed on the rigid structure (14).

12 Claims, 1 Drawing Sheet

EXTERIOR PANELS FOR MOTOR VEHICLES

This application is the national phase of international application PCT/US99/11194 filed May 20, 1999 which designated the U.S.

This application also claims the benefit of U.S. Provisional Application No. 60/086,616, filed May 22, 1998.

GOVERNMENTAL SUPPORT AND INTEREST:

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES-NEW LOW COST/HIGH STRENGTH MATERIALS FOR AUTOMOTIVE PARTS," awarded Sep. 30, 1997 by the United States Department of Commerce, National Institute of Standards and Technology, Advanced Technology Program. The Government has certain rights in this invention.

FIELD OF THE INVENTION

This invention relates to an exterior panel for a motor vehicle. In particular, this invention relates to an exterior body panel for a motor vehicle.

BACKGROUND OF THE INVENTION

The present invention relates to automotive exterior body components that can be provided with improved dimensional stability, increased structural modulus (stiffness) and strength while increasing surface toughness. At the same time, the exterior body parts can be made with less material, and thus lighter, while achieving the above-improved structural characteristics. In addition, because less material is used, manufacturing costs are reduced.

Hard exterior vehicle parts, such as hoods, quarter panels, truck beds, outside door panels, lift gates, truck lids, bumper beams, and tailgates generally require high dimensional stability, low flexibility, and a low coefficient of thermal expansion. For example, these parts cannot have a high coefficient of linear thermal expansion because they are generally bounded on two or more sides by other parts, with a predetermined gap therebetween. If these parts expand or contract to a large extent, the gap would have to be made larger than desirable to accommodate large expansion on hot days or smaller than desirable to accommodate shrinkage on cold days. Thus, the coefficient of linear thermal expansion for these parts should be less than $20 \times 10^{-6}$ inches of expansion per inch of material per degree Fahrenheit (IN/IN)/°F. In the past, these components have been typically constructed from metal material, such as steel.

Plastics are advantageous over steel in that they are lighter in weight and are not subject to the same degree of deterioration due to oxidation. Thermoset plastics, such as polyester resin molding compounds (SMC and BMC) have also been employed for various hard exterior panel applications, such as in the Corvette automobile. These thermoset materials have been highly reinforced, e.g., with glass fibers or mineral fillers constituting about 40–50% reinforcement material by volume of the total volume of the resultant product, to provide sufficient reinforcement and structural rigidity to suit the application. While adequate impact absorption and low thermal expansion can be achieved with the highly reinforced thermoset plastic material, the high reinforcement makes the resultant panel difficult to paint; requiring several coats and touch-up to achieve an even surface appearance.

Thermoplastics would be an advantageous material in comparison with thermosets for automotive hard exterior panel applications, because thermoplastics have much better ductility and thus much better impact absorption characteristics than thermosets. Thermoplastics would also be preferred because they are inherently easier to recycle, both from scrap material or defect parts during production and from scrapped vehicles that are no longer operational. Furthermore, thermoplastics, and in particular polyolefin thermoplastics, are less expensive than thermoset materials.

However, in contrast to thermosets, thermoplastics have not been widely used for exterior vehicle body components because they have been difficult to mold after being loaded with sufficient amounts of glass fiber and mineral reinforcement fillers. Thus, thermoplastics have not been able to be molded with enough reinforcement material to achieve the required impact strength and dimensional stability (e.g., low coefficient of thermal expansion) for exterior vehicle body parts.

SUMMARY OF THE INVENTION

The disadvantages of the prior art may be overcome by providing an exterior panel for a motor vehicle having a coefficient of linear thermal expansion of less than $20 \times 10^{-6}$ inches of expansion per inch material per degree Fahrenheit. The exterior panel comprises a rigid structure formed from at least one thermoplastic olefin material and reinforcement particles dispersed within the at least one thermoplastic olefin. The reinforcement particles comprise less than 15% of a total volume of the rigid structure. At least 40% of the reinforcement particles have a thickness less than about 50 nanometers. A decorative coating layer having a least one coloring agent is disposed on the rigid structure.

In a more preferred embodiment, at least 50% of the reinforcement particles have a thickness less than about 20 nanometers. It is also preferred for at least 99% of the reinforcement particles to have a thickness less than about 30 nanometers.

DETAILED DESCRIPTION OF THE INVENTION

Figure 1:
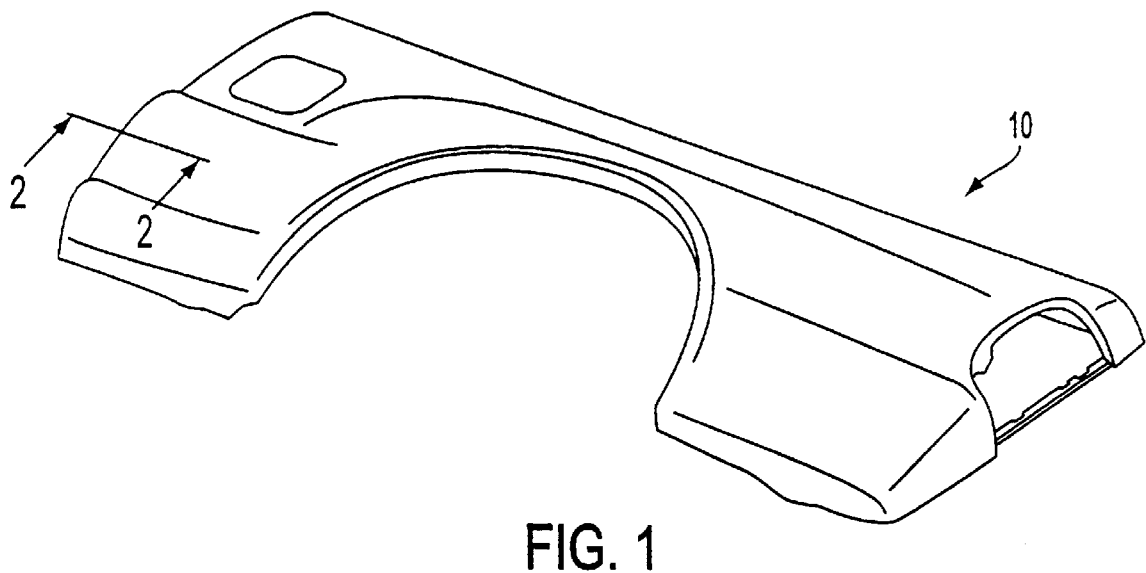
FIG. 1 is a perspective view of an exterior vehicle panel manufactured in accordance with the present invention.

The exterior vehicle panels manufactured in accordance with the present invention comprises a composite material of a polymer having dispersed therein reinforcement fillers in the form of very small mineral reinforcement particles. The reinforcement filler particles, also referred to as "nanoparticles" due to the magnitude of their dimensions, each comprise one or more generally flat platelets. Each platelet has a thickness of between 0.7–1.2 nanometers. Generally, the average platelet thickness is approximately 1 nanometer thick. The aspect ratio (which is the largest dimension divided by the thickness) for each nanoparticle is between about 50 to about 300.

The platelet particles or nanoparticles are derivable from larger, layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadiite, and kenyaite. Mixed Mg and Al hydroxides may also be used. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range. Thermoplastic polymers are more viscous than thermosets, and thus lend themselves more easily to the high sheering mixing action. Thus, thermoplastic polymers are a preferred material for facilitating exfoliation.

The composites of the present invention are prepared by combining the platelet mineral with the desired polymer in the desired ratios. The components can be blended by general techniques known to those skilled in the art. For example, the components can be blended and then melted in mixers or extruders.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190. Additional background is included in the following references: U.S. Pat. Nos. 4,739,007 and 5,652,284.

The polymer used for the purposes of the present invention is a thermoplastic. The thermoplastic is preferably a polyolefin, a blend of polyolefins, an engineering thermoplastic, a blend of engineering thermoplastics, or a blend of at least one polyolefin with at least one engineering thermoplastic. The preferred polyolefin is at least one member selected from the group consisting of polypropylene, ethylene-propylene copolymers, thermoplastic olefins (TPOs), and thermoplastic polyolefin elastomers (TPEs).

The exfoliation of layered mineral particles into constituent layers need not be complete in order to achieve the objects of the present invention. The present invention contemplates that at least 40% of the particles should be less than about 50 nanometers in thickness and, thus, at least 40% of the particles should be less than about 50 platelets stacked upon one another in the thickness direction. More preferably, at least 50% of the particles should have a thickness of less than 10 nanometers. Even more preferably, at least 70% of the particles should have a thickness of less than 5 nanometers.

It is most preferable to have as many particles as possible to be as small as possible, ideally including only a single platelet. In any event, most of the advantages in accordance with the present invention accrue where at least 50% of the reinforcement particles have a thickness of less than about 20 nanometers and at least 99% of the reinforcement particles have a thickness of less than about 30 nanometers.

As stated above, the preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably, at least 90% of the particles have an aspect ratio within the 100–200 range.

Figure 2:
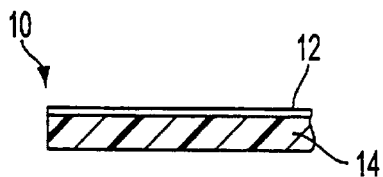
FIG. 2 is a cross sectional view taken through the line 2—2 in FIG. 1.

A panel in accordance with the present invention is generally illustrated by reference numeral 10 in FIG. 1. The cross sectional view of FIG. 2 illustrates a rigid structure 14 comprising at least one thermoplastic and reinforcement particles dispersed therein. A colored coating layer (paint) is illustrated by reference numeral 12.

It is preferable for these hard exterior panels to have reinforcement particles of the type described herein comprising about 6–15% of the total volume of the panel. with the balance comprising the thermoplastic substrate and suitable additives. If greater than 15% by volume of reinforcement filler is used, the viscosity of the composition becomes too high and thus difficult to mold. It is even more preferable for these exterior panels to have reinforcement particles of the type contemplates herein comprising about 8%–12% of the total volume of the panel. The coefficient of linear thermal expansion for these parts in accordance with the present invention is less than about $20 \times 10^{-6}$ (IN/IN)/°F., preferably less than about $15 \times 10^{-6}$ inches of expansion per inch material per degree Fahrenheit (IN/IN)/°F., and even more preferably less than $12 \times 10^{-6}$ (IN/IN)/°F.

The specific gravity of these parts is between 1.1–1.4, and the modulus is between 350,000 PSI and 1,000,000 PSI.

The present invention employs conventional injection molding techniques to mold the resultant exterior vehicle panel with the thermoplastic having nanoparticle reinforcement fillers dispersed therein as discussed above.

Additional benefits accrue. More specifically, the reinforced panels in accordance with the present invention are easier to paint than other polymer exterior panels that are highly loaded with conventional reinforcing fillers. The paint or decorative coating layer is illustrated by reference numeral 12 in FIG. 2. The preferred paint used for this application is an elastomeric acrylic melamine.

Moreover, because thermoplastic materials can be used, the parts can be molded by an injection molding technique, as opposed to the much slower compression molding technique that would be used when conventionally reinforcing polymers.

Furthermore, using thermoplastics makes it easier to disperse the nanoparticles by a shearing process, whereby the nanoparticles are impregnated with water, then frozen and then dried. The freeze-dried particles are then distributed into molten thermoplastic material. The thermoplastic material is more viscous than thermoset materials, and thus lends itself to being worked in sheer to peel individual platelets from multi-platelet particles and thereby reduce the particle sizes to the desired range.

A further advantage is better ductility, good impact resistance, and low coefficient of thermal expansion, all with less weight and less material.

It should be appreciated that the foregoing description is illustrative in nature and that the present invention includes modifications, changes, and equivalents thereof, without departure from the scope of the invention.

What is claimed is:

1. An exterior panel for a motor vehicle, comprising: a rigid structure having a rigidity sufficient for said rigid structure to be used as said exterior panel for a motor vehicle and being formed from at least one thermoplastic material and reinforcement particles dispersed within the at least one thermoplastic material, said reinforcement particles comprising less than 15% of a total volume of the rigid structure, at least 40% of the reinforcement particles having a thickness less than about 50 nanometers, said rigid structure having a coefficient of linear thermal expansion of less than $20 \times 10^{-6}$ inches of expansion per inch material per degree Fahrenheit, and a decorative coating layer having at least one coloring agent disposed on the rigid structure and being suitable for use as an exterior motor vehicle finish.

2. An exterior panel for a motor vehicle in accordance with claim 1, wherein at least 50% of the reinforcement particles have a thickness of less than about 20 nanometers and at least 99% of the reinforcement particles have a thickness of less than about 30 nanometers.

3. An exterior panel for a motor vehicle in accordance with claim 1, wherein said reinforcement particles comprise one or more materials from a group consisting of montmorillonite, vermiculite, hectorite, saponite, hydrotalcites, kanernite, sodium octosilicate, magadiite, and kenyaite.

4. An exterior panel for a motor vehicle in accordance with claim 1, wherein said at least one thermoplastic is selected from a group consisting of polyolefin, a blend of polyolefins, an engineering thermoplastic, a blend of engineering thermoplastics, and a blend of at least one polyolefin with at least one engineering thermoplastic.

5. An exterior panel for a motor vehicle in accordance with claim 1, wherein said at least one thermoplastic comprises a polyolefin selected from the group consisting of polypropylene, ethylenepropylene copolymers, thermoplastic olefins (TPOs), and thermoplastic polyolefin elastomers (TPEs).

6. An exterior panel for a motor vehicle in accordance with claim 1, wherein at least 80% of the reinforcement particles have an aspect ratio of about 50 to about 300.

7. An exterior panel for a motor vehicle in accordance with claim 1, wherein at least 90% of the reinforcement particles have an aspect ratio of about 100 to about 200.

8. An exterior panel for a motor vehicle in accordance with claim 1, wherein said reinforcement particles comprise between about 6% to about 15% of the total volume of the rigid structure.

9. An exterior panel for a motor vehicle in accordance with claim 8, wherein said reinforcement particles comprise between about 8% to about 12% of the total volume of the rigid structure.

10. An exterior panel for a motor vehicle in accordance with claim 9, wherein said rigid structure has a coefficient of linear thermal expansion of less than about $15 \times 10^{-6}$ inches of expansion per inch material per degree Fahrenheit.

11. An exterior panel for a motor vehicle in accordance with claim 9, wherein said rigid structure has a coefficient of linear thermal expansion of less than about $12 \times 10^{-6}$ inches of expansion per inch material per degree Fahrenheit.

12. An exterior panel for a motor vehicle in accordance with claim 1, wherein said decorative coating layer having said least one coloring agent comprises an elastomeric acrylic melamine.

* * * * *